(No Model.)
J. N. JARBOE.
CHRISTMAS TREE HOLDER.
No. 589,896. Patented Sept. 14, 1897.
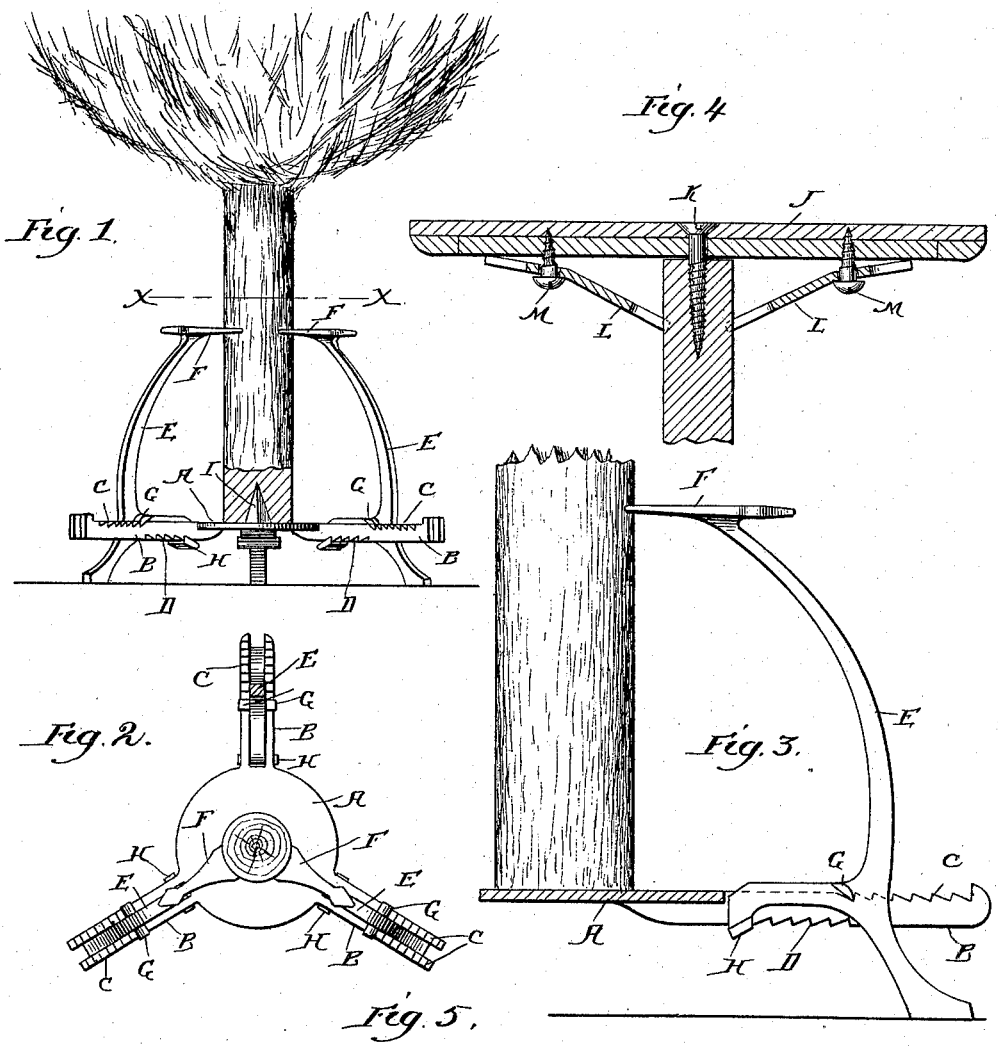
WITNESSES
H. B. Hallock.
S. J. Williamson
INVENTOR.
Joseph N. Jarboe.
BY Geo. H. Holgate
ATTORNEY.

UNITED STATES PATENT OFFICE.

JOSEPH N. JARBOE, OF PHILADELPHIA, PENNSYLVANIA.

CHRISTMAS-TREE HOLDER.

SPECIFICATION forming part of Letters Patent No. 589,896, dated September 14, 1897.

Application filed October 21, 1896. Serial No. 609,583. (No model.)

*To all whom it may concern:*

Be it known that I, JOSEPH N. JARBOE, a citizen of the United States, residing at Philadelphia, (Frankford,) in the county of Philadelphia and State of Pennsylvania, have invented a certain new and useful Improvement in a Combined Christmas Tree, Table-Support, and Hanging Basket, of which the following is a specification.

My invention relates to a new and useful improvement in Christmas-tree holders, which may be utilized not only for the holding upright of such a tree when desired, but also for the formation of a hanging basket, table, or other similar device, and has for its object to provide a cheap and simple arrangement which may be thus utilized and which can be quickly adjusted for the several purposes for which it is adapted by a person without skill.

With these ends in view this invention consists in the details of construction and combination of elements hereinafter set forth and then specifically designated by the claims.

In order that those skilled in the art to which this invention appertains may understand how to make and use the same, its construction and operation will now be described in detail, referring to the accompanying drawings, forming a part of this specification, in which—

Figure 1 represents one embodiment of my improvement shown in position for the support of a tree; Fig. 2, a section at the line *x x* thereof; Fig. 3, an enlarged view of one of the supports, showing the base in section, so as to illustrate the method of attaching the support to the ratchet extension; Fig. 4, a central section of a table supported by my improvement; Fig. 5, a bottom plan thereof, the upright being in section.

In carrying out my invention as embodied in Figs. 1, 2, 3, and 4, A represents the base, with which are formed the extensions B, here shown as three in number and projecting radially from the base, and these extensions have formed upon their upper surfaces the ratchet-teeth C and upon their lower surfaces the ratchet-teeth D, and are composed of two members lying parallel with each other at a sufficient distance apart to permit the lower portion of the support E to fit therebetween and be guided thereby.

The supports E are so formed as to provide upwardly-extending arms and downwardly-extending feet, the latter adapted to rest upon the floor while the former terminate in jaws F, arranged to embrace the butt of the tree to be supported, and in order that the supports may be made adjustable, the detents G, which are formed thereon, are adapted to engage with the teeth C, while the detents H, also formed upon the supports, are adapted to engage with the teeth D, by which arrangement it is obvious that when the jaws are brought into firm contact with the tree these detents, engaging with their respective ratchet-teeth, will firmly hold the supports in position until they are disengaged from said teeth by sufficient strain being brought thereon for that purpose, from which it will be seen that a tree of any size may be firmly held and supported upon the base, and as the feet of the supports come in contact with the floor at a considerable distance from the center of the base the liability of the tree tipping over from ordinary causes is decreased.

In placing the tree upon the base the butt-end thereof is centered and prevented from slipping sidewise by the spur I, which projects upward from the base, as clearly shown. After the time has passed when the use of a Christmas tree is desirable my improvement, in conjunction with the next-described device, may be utilized for the formation of a table, and this is accomplished in the following manner: The tree is sawed off at the height at which it is desired that the table shall stand and utilized for a central upright, to which the top of the table is secured, and this top J may be of any size or design to suit the fancy of the user and is first centered upon the upright by the passage of a screw K therethrough and into the upright, as clearly shown in Fig. 4, after which the clamps L, which are secured to the under side of the top by the screws M, are caused to embrace the upright by their forked ends, and they may bear with any desired pressure upon the upright by the proper manipulation of the screws M. When this is accomplished, it will be seen that a neat and ornamental table will be provided, which will not only serve the general purposes of the table, but will also prevent the loss of that portion of the device which is used for the support of the tree, so that it may be ready for use upon the return of another Christmas.

It is to be noted that when the base is utilized for the support of a tree the top may also be utilized for the same purpose, thereby providing for the support of two trees, since when the top is inverted and placed upon the floor a tree may be held in the same manner as the top was secured to the upright, as clearly shown in Fig. 5.

It is obvious that a variety of designs may be utilized for the base as well as for the remaining features of my improvement without departing from the spirit of my invention, and I therefore do not wish to be limited to the exact details of construction here shown and described.

Having thus fully described my invention, what I claim as new and useful is—

1. A tree-support, consisting of a base, extensions formed therewith, ratchet-teeth formed upon both sides of the extensions, support-arms guided by the extensions and held by the teeth, and a spur for centering the butt of the tree, as specified.

2. A base, extensions formed therewith, said extensions consisting of two members lying parallel with each other and of a distance apart, ratchet-teeth formed with the extensions upon the upper and under sides thereof, supports fitted between the members of the extensions, detents formed with said supports for the engagement with the ratchet-teeth, jaws also formed with said supports, and feet formed upon the lower ends thereof, substantially as shown and described.

In testimony whereof I have hereunto affixed my signature in the presence of two subscribing witnesses.

JOSEPH N. JARBOE.

Witnesses:
S. S. WILLIAMSON,
F. MATTNER.